(12) United States Patent
Koehler et al.

(10) Patent No.: US 9,854,552 B2
(45) Date of Patent: Dec. 26, 2017

(54) METHOD AND APPARATUS FOR IMPROVED SCHMIDL-COX-BASED SIGNAL DETECTION

(71) Applicant: NATIONAL INSTRUMENTS CORPORATION, Austin, TX (US)

(72) Inventors: Max Koehler, Dresden (DE); Achim Nahler, Dresden (DE); Amal Ekbal, Los Angeles, CA (US)

(73) Assignee: NATIONAL INSTRUMENTS CORPORATION, Austin, TX (US)

( * ) Notice: Subject to any disclaimer, the term of this patent is extended or adjusted under 35 U.S.C. 154(b) by 0 days.

(21) Appl. No.: 14/740,425

(22) Filed: Jun. 16, 2015

(65) Prior Publication Data

US 2016/0374042 A1 Dec. 22, 2016

(51) Int. Cl.
*H04B 17/00* (2015.01)
*H04W 56/00* (2009.01)
*H04L 27/26* (2006.01)

(52) U.S. Cl.
CPC ..... *H04W 56/0035* (2013.01); *H04L 27/2663* (2013.01); *H04L 27/2671* (2013.01); *H04L 27/2675* (2013.01); *H04L 27/2688* (2013.01)

(58) Field of Classification Search
CPC ........... H04W 56/0035; H04L 27/2663; H04L 27/2671; H04L 27/2675; H04L 27/2688
See application file for complete search history.

(56) References Cited

U.S. PATENT DOCUMENTS

| 8,320,481 | B2 | 11/2012 | Jin | |
|---|---|---|---|---|
| 2006/0146962 | A1* | 7/2006 | Troya | H04L 27/2656 375/340 |
| 2010/0091911 | A1* | 4/2010 | Sawai | H04L 5/0023 375/340 |
| 2010/0158079 | A1* | 6/2010 | Li | H04J 11/0073 375/147 |
| 2014/0009233 | A1* | 1/2014 | Cabrera | H03F 1/0277 330/273 |

(Continued)

OTHER PUBLICATIONS

Schmidl, Timothy M. et al.—"Robust Frequency and Timing Synchronization for OFDM"—IEEE Transactions on communications, vol. 45, No. 12, Dec. 1997, pp. 1613-1621 (9 pages).

*Primary Examiner* — Xin Jia
(74) *Attorney, Agent, or Firm* — Meyertons Hood Kivlin Kowert & Goetzel, P.C.; Jeffrey C. Hood; Michael B. Davis

(57) ABSTRACT

Techniques are disclosed relating to detection of wireless signals. In some embodiments, a method includes generating an autocorrelation result for a training field in a received wireless message, generating differentiation information based on the autocorrelation result, and determining that one or more signal recognition criteria are met. In some embodiments, the signal recognition criteria include a first criterion that a first peak in the differentiation information satisfies a first threshold for at least a first time interval. In some embodiments, the signal recognition criteria include one or more additional criteria, including a second criterion that a second peak in the differentiation information satisfies a second threshold for at least a second time interval, wherein the first and second peaks have different polarities and/or a third criterion that the first peak corresponds to an autocorrelation result value that is below a particular autocorrelation threshold.

19 Claims, 8 Drawing Sheets

(56) References Cited

U.S. PATENT DOCUMENTS

2014/0321583 A1* 10/2014 Kis .................... H04B 7/0811
375/340
2015/0270999 A1 9/2015 Jahan
2016/0112236 A1* 4/2016 Dhayni ............... H04L 27/2666
375/340

* cited by examiner

METHOD AND APPARATUS FOR IMPROVED SCHMIDL-COX-BASED SIGNAL DETECTION

BACKGROUND

Technical Field

This disclosure relates to wireless signal detection using autocorrelation.

Description of the Related Art

Detecting desired signals at a wireless receiver is often performed by identifying a training field in a received wireless message. This may facilitate timing and/or frequency synchronization for wireless communications. Reduction in the number of false positives (e.g., indicating that a desired signal was detected when none was received), false negatives (failing to identify a desired signal), and/or timing errors may improve communications efficiency and/or power consumption metrics.

SUMMARY

Techniques are disclosed relating to wireless signal detection using autocorrelation.

In some embodiments, a method includes generating an autocorrelation result for a training field in a received wireless message, generating differentiation information based on the autocorrelation result, and determining that one or more signal recognition criteria are met. In some embodiments, the signal recognition criteria include a first criterion that a first peak in the differentiation information satisfies a first threshold for at least a first time interval. In some embodiments, the signal recognition criteria include one or more additional criteria, including a second criterion that a second peak in the differentiation information satisfies a second threshold for at least a second time interval, where the first and second peaks have different polarities and/or a third criterion that the first peak corresponds to an autocorrelation result value that is below a particular autocorrelation threshold. In some embodiments, the method includes performing at least one of time synchronization or frequency synchronization for the wireless message in response to determining that the one or more signal recognition criteria are met. In some embodiments, a non-transitory computer readable medium has program instructions stored that are executable to perform various ones of the method elements.

In some embodiments, an apparatus includes wireless circuitry configured to generate an autocorrelation result for a training field in a received wireless message, generate differentiation information based on the autocorrelation result, and determine that one or more signal recognition criteria are met. In some embodiments, the signal recognition criteria include a first criterion that a first peak in the differentiation information satisfies a first threshold for at least a first time interval. In some embodiments, the signal recognition criteria include one or more additional criteria, including a second criterion that a second peak in the differentiation information satisfies a second threshold for at least a second time interval, where the first and second peaks have different polarities and/or a third criterion that the first peak corresponds to an autocorrelation result value that is below a particular autocorrelation threshold. In some embodiments, the wireless circuitry is configured to indicate detection of the wireless message in response to determining that the signal recognition criterion are met.

Figure 1A:
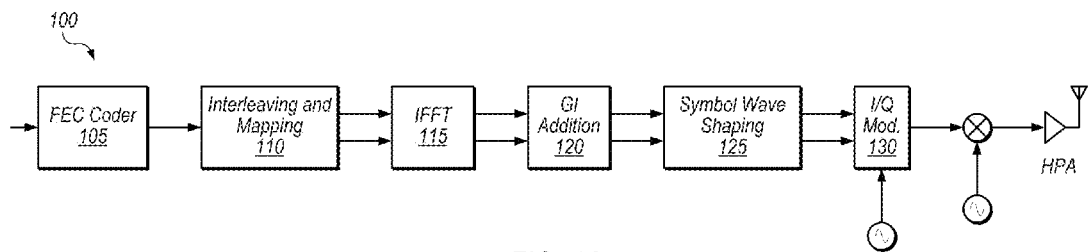
FIG. 1A is a block diagram illustrating an exemplary wireless baseband transmitter, according to some embodiments.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Acronyms

The following acronyms may be used in the present disclosure.

BER: Bit Error Rate
CDMA: Code Division Multiple Access
DL: Downlink
FFT: Fast Fourier Transform
FPGA: Field Programmable Gate Array
GSM: Global System for Mobile Communications
LTE: Long Term Evolution
MIMO: Multiple Input Multiple Output
OFDM: Orthogonal Frequency-Division Multiplexing
PER: Packet Error Rate
RAT: Radio Access Technology
RF: Radio Frequency
RX: Receive
SDR: Software Defined Radio
SRP: Software Radio Peripheral
TX: Transmit UE: User Equipment UL: Uplink Terms The following is a glossary of terms used in the present application:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, other handheld devices, as well as wearable devices such as wrist-watches, headphones, pendants, earpieces, etc. In general, the term "UE" or "UE device" can be broadly defined to encompass any electronic, computing, and/or telecommunications device (or combination of devices) which is easily transported by a user and capable of wireless communication.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Exemplary Transmitter and Receiver Circuitry

Figure 1B:
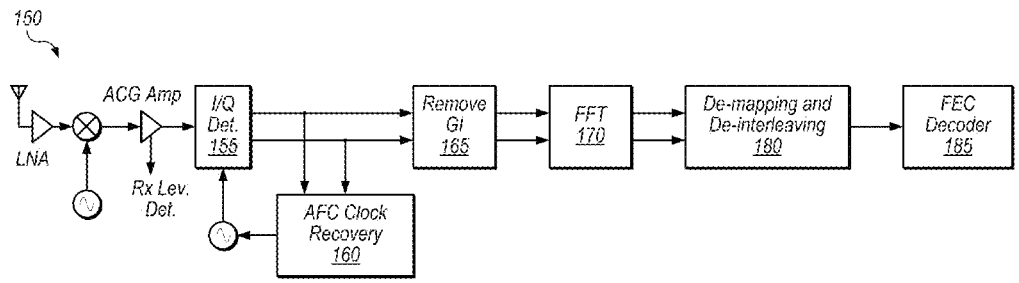
FIG. 1B is a block diagram illustrating an exemplary wireless baseband receiver, according to some embodiments.

FIG. 1A is a block diagram illustrating an exemplary wireless baseband transmitter 100 while FIG. 1B is a block diagram illustrating an exemplary wireless baseband receiver 150, according to some embodiments. In the illustrated embodiment, the wireless communication system of FIGS. 1A-1B is configured for orthogonal frequency-division multiplexing (OFDM) communications.

In the illustrated embodiment, transmitter 100 includes forward error correction (FEC) coder 105, interleaving and mapping element 110, inverse Fast Fourier Transform (IFFT) element 115, guard interval (GI) addition element 120, symbol wave shaping element 125, in-phase/quadrature (I/Q) modulation element 130, a high powered amplifier (HPA), a radio frequency (RF) up-conversion element, and an antenna.

FEC coder 105 may apply an FEC code to received data from a higher-layer process, and may be used to detect and/or correct transmission errors. Interleaving and mapping element 110 may map the encoded bits onto OFDM symbols. The IFFT 115 may correspond to modulation (and eventually be reversed by the FFT 170 at the receiver). GI addition element 120 may insert a cyclic prefix into one or more guard intervals. The subsequent modulation may prepare the signal for RF transmission.

In the illustrated embodiment, receiver 150 includes an antenna, a low-noise amplifier (LNA), an RF down-conversion element, an automatic gain control (AGC) amplifier, an I/Q determination element 155, an automatic frequency clock (AFC) recovery element 160, a GI removal element 165, a Fast Fourier Transform (FFT) element 170, a de-mapping and de-interleaving element 180, and an FEC decoder 185. In the absence of errors, the outputs of receiver 150 may correspond to the data received by transmitter 100 and transmitted to receiver 150 and may be provided to a higher layer for further processing.

The elements of transmitter 100 and receiver 150 are exemplary and are not intended to limit the scope of the present disclosure. The disclosed techniques may be used for any of various appropriate OFDM systems.

Exemplary Signal Structure

Figure 2:
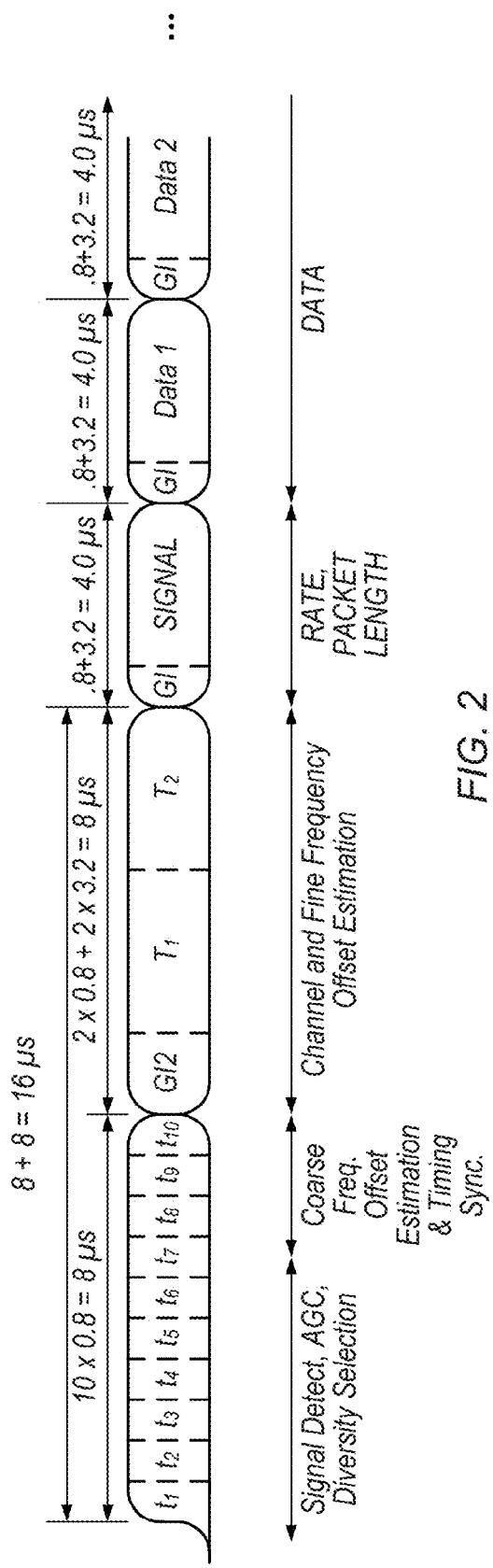
FIG. 2 is a signal diagram illustrating an exemplary 802.11 burst structure, according to some embodiments.

FIG. 2 shows an exemplary OFDM burst communication structure, according to some embodiments. In the illustrated embodiment, the first 16 microseconds (μs) of the burst correspond to a training field, followed by a payload field and reference signals. The illustrated guard intervals may include a cyclic prefix, in some embodiments. In some embodiments, the training field is used to provide a-priori information in order to allow the receiver to detect the signal and perform coarse time and frequency synchronization.

The illustrated structure may correspond to an 802.11 burst structure. The structure of FIG. 2 is exemplary and is not intended to limit the scope of the present disclosure. In other embodiments, any of various appropriate structures that include training field(s) and are usable for autocorrelation may be implemented. Further, the disclosed techniques are not limited to WIFI or even to wireless transmission. In some embodiments, similar techniques may be used for cellular communications, etc.

Schmidl-Cox Overview

The Schmidl-Cox-based algorithm is one technique for signal detection in orthogonal frequency-division multiplexing (OFDM)-based wireless communication systems. This algorithm may provide rapid and robust detection and synchronization of OFDM signals, perform well in frequency selective channels, provide accurate estimates of symbol timing and carrier frequency offset, and provide a signal to noise ratio (SNR) estimate. Although the Schmidl-Cox technique and equations are described herein for exemplary purposes, they are not intended to limit the scope of the present disclosure. In some embodiments, the disclosed techniques may be used with other approaches that may or may not fall under the Schmidl-Cox method.

In some embodiments, Schmidl-Cox-based processing makes use of the autocorrelation behavior of the signal to be detected. In some embodiments, a timing metric (tm) is determined as an autocorrelation of received samples, e.g., according to equations (1)-(3):

$$q(i) = \left\| \sum_{j=0}^{CP-1} x(i+j)x*(i+j-CP) \right\|^2 \quad (1)$$

$$z(i) = \left( \sum_{j=0}^{CP-1} \|x(i+j)\|^2 \right)^2 \quad (2)$$

$$tm(i) = \frac{q(i)}{z(i)} \quad (3)$$

where x represents the value of a particular sample and CP represents a value of the cyclic prefix.

In some embodiments, differentiation information (a) is determined for the timing metric, e.g., according to equation (4):

$$a(i) = \sum_{j=0}^{CP-1} tm(i+j-2CP) - \sum_{j=0}^{CP-1} tm(i+j) \quad (4)$$

Figure 3:
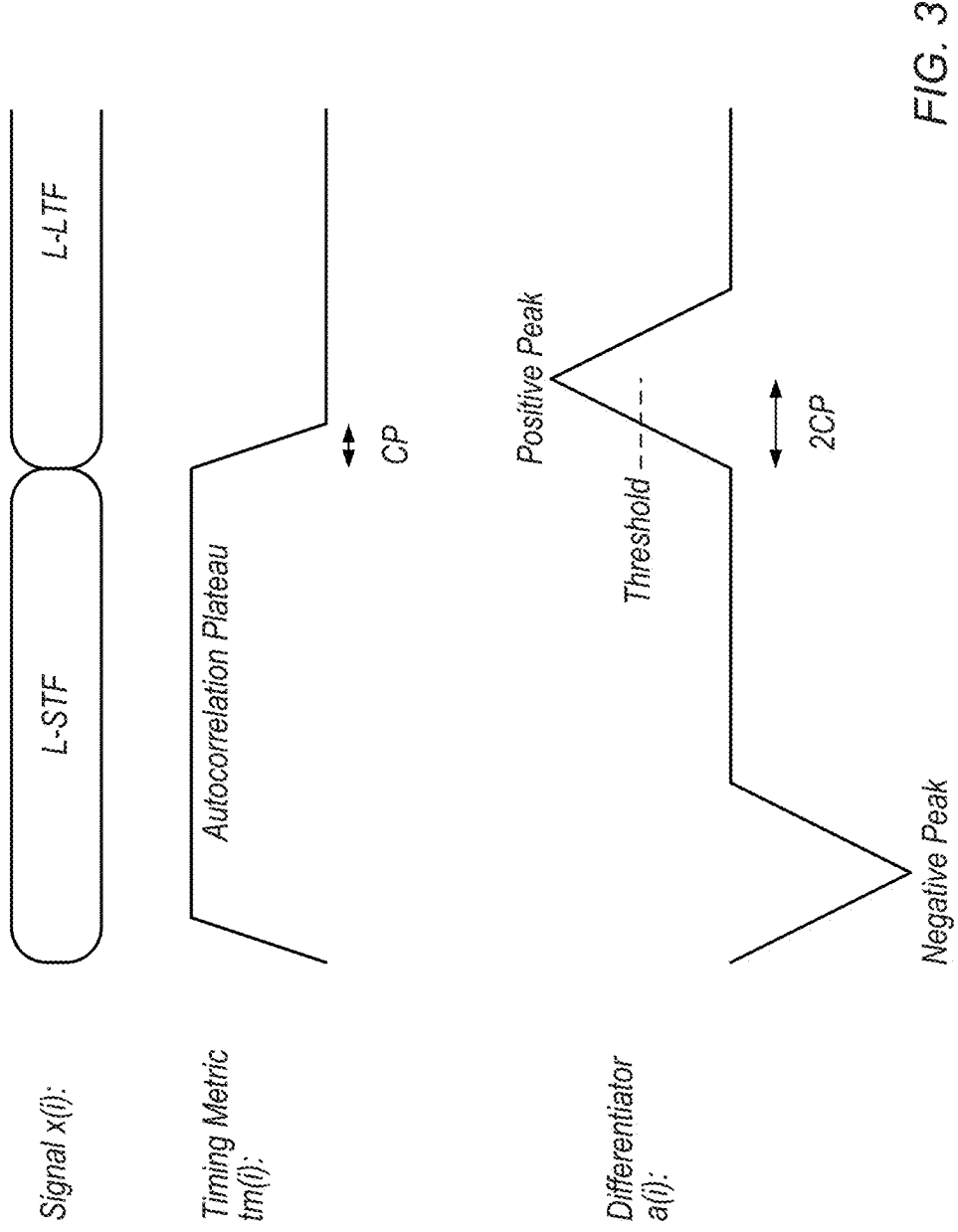
FIG. 3 is a simplified signal diagram illustrating a timing metric and differentiator for a training field, according to some embodiments.

FIG. 3 is a simplified and idealized diagram illustrating timing metric and differentiator values, according to some embodiments. In the illustrated embodiment, the non-high throughput (non-HT) short training field (L-STF) corresponds to the first eight μs of the training field of FIG. 2 while the non-HT long training field (L-LTF) corresponds to the second eight μs of FIG. 2. As shown, there is an autocorrelation peak in the timing metric during the L-STF field that rises over an interval corresponding to the length of the cyclic prefix (and falls over a similar interval).

As shown, there is a negative peak in the differentiator corresponding to the rise of the timing metric that corresponds in width to four times the length of the cyclic prefix as well as a positive peak in the differentiator corresponding to the fall of the timing metric that also corresponds in width to four times the length of the cyclic prefix.

Figure 4:
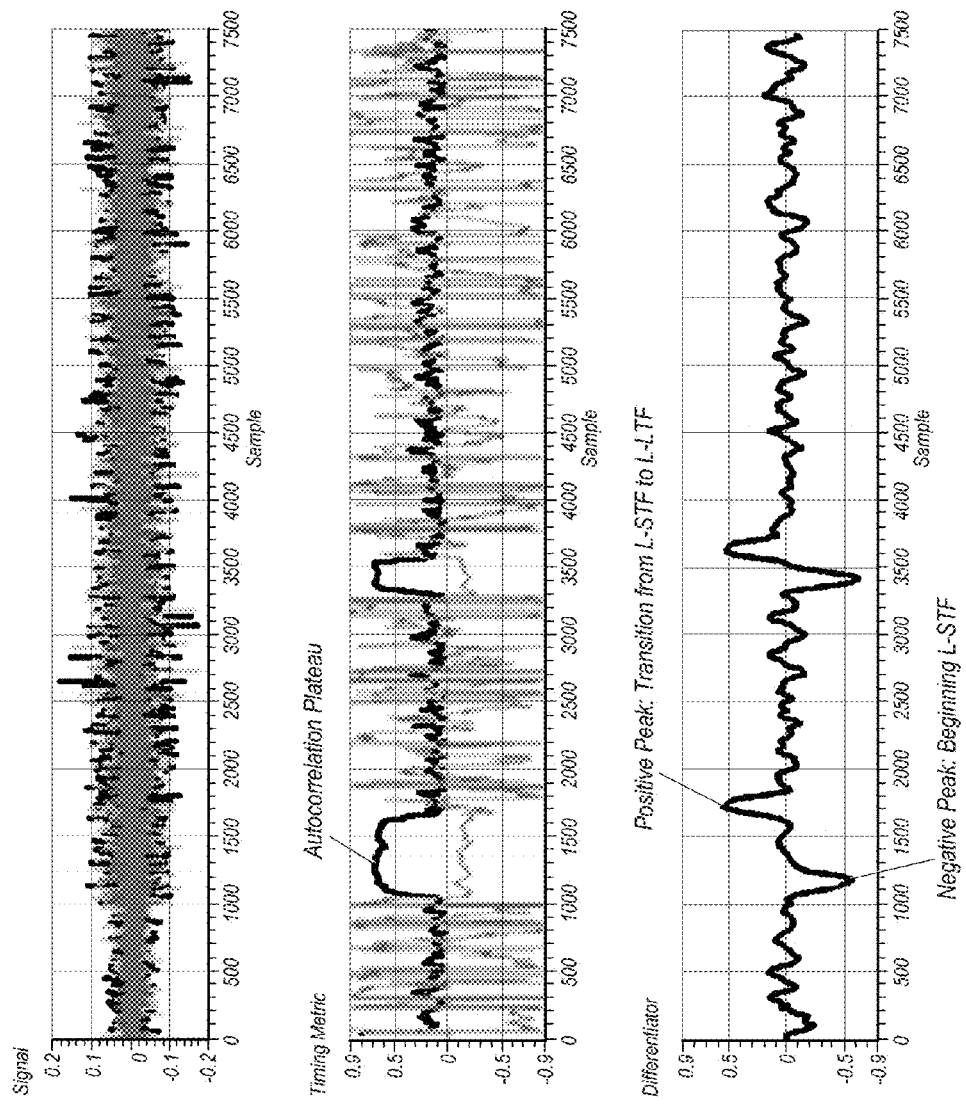
FIG. 4 is a signal diagram illustrating the timing metric and differentiator for an exemplary signal in the absence of interference.

FIG. 4 is a signal diagram that shows a received signal (without unwanted interfering signals but with additive white Gaussian noise (AWGN)) in the upper graph, autocorrelation in the middle graph, and the differentiator (e.g., determined according to equation (4) above) in the lower graph. In the signal plot, the darker values correspond to the in-phase portion of the signal while the gray values correspond to the quadrature phase of the signal. In the autocorrelation plot, the darker values correspond to the magnitude of the autocorrelation while the gray values correspond to the phase of the autocorrelation. In the differentiator plot, the values correspond to the magnitude of the differentiator. Similarly to the idealized illustration of FIG. 3, the differentiator has a negative peak corresponding to the beginning of L-STF and the autocorrelation plateau and a positive peak corresponding to the transition from L-STF to L-LTF and the end of the autocorrelation plateau.

In conventional Schmidl-Cox processing, it may be assumed that a desired signal is available if the positive peak in the differentiation is above a threshold (e.g., the threshold shown in FIG. 3) for a pre-defined interval (e.g., a predefined number of samples). In some situations, however, this technique may produce false positives (e.g., indicate detection of a signal that is not really present), false negatives (failure to detect a transmitted signal), and/or signal processing errors (e.g., failures to perform accurate synchronization). These failures may be due to interference with the normalized autocorrelation techniques by unwanted signals that are not fully uncorrelated.

Examples of interfering signals may include: correlated noise from a non-ideal RF front end, remaining direct current (DC) offset from a non-ideal RF front end, other interference based on a non-ideal RF front end, in-band interfering signals (e.g., from other networks communicating on the same carrier frequency, such as other WIFI networks in WIFI embodiments), interfering signals from adjacent channels, and/or interfering signals from other systems (e.g., in ISM bands) either in-band or adjacent.

Figure 5:
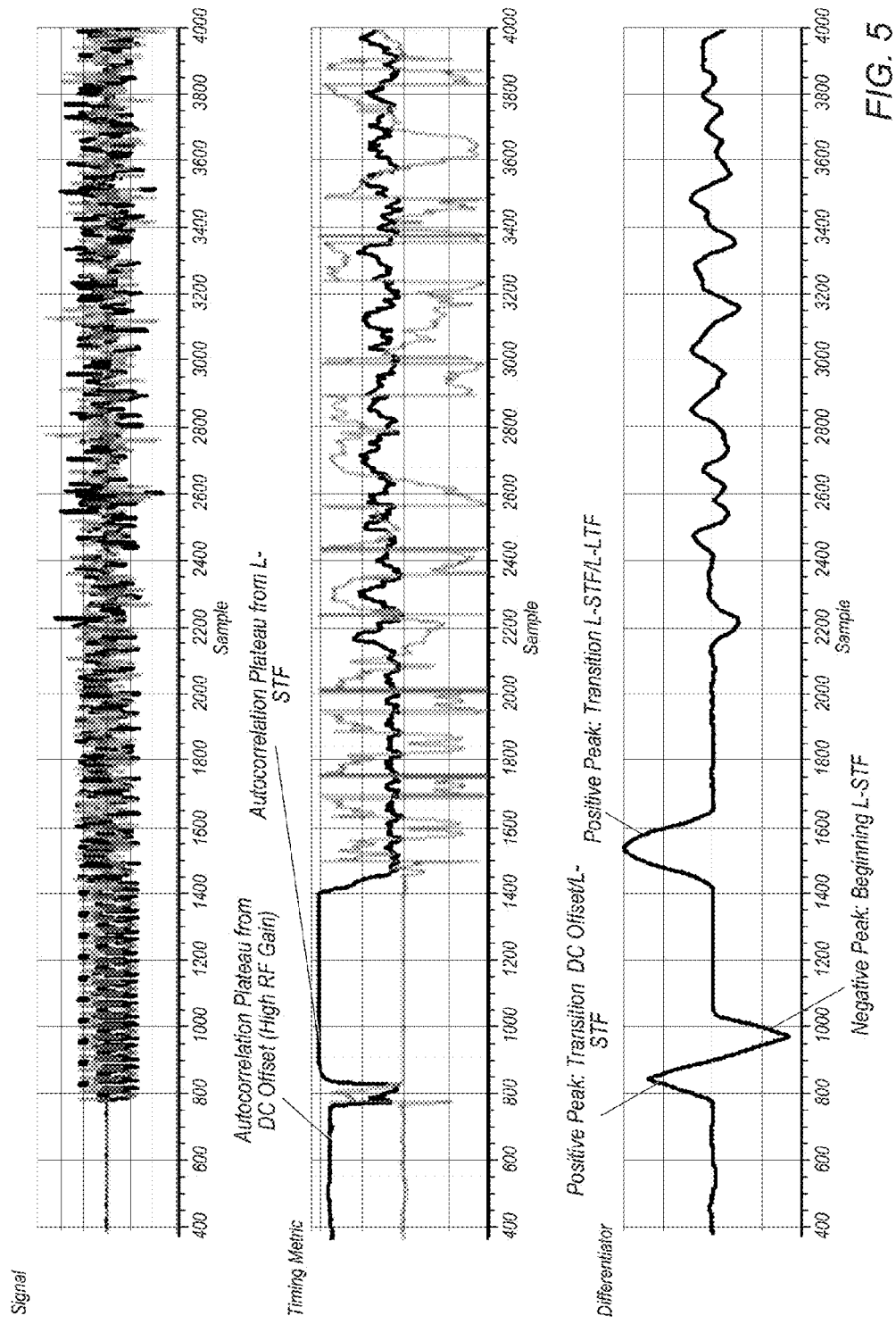
FIGS. 5 and 6 are signal diagrams that illustrating the effects of exemplary interfering signals on the timing metric and differentiator.

FIG. 5 is a signal diagram that shows effects of exemplary interfering signals. In the illustrated embodiment, the signal is imposed with AWGN and a high direct current (DC) offset corresponding to non-ideal RF front end. In the illustrated embodiment, the autocorrelation result has a plateau from high DC offset. As shown, this may cause a positive peak in the differentiator, which may result in processing errors (e.g., due to incorrect synchronization) using traditional signal detection techniques.

Figure 6:
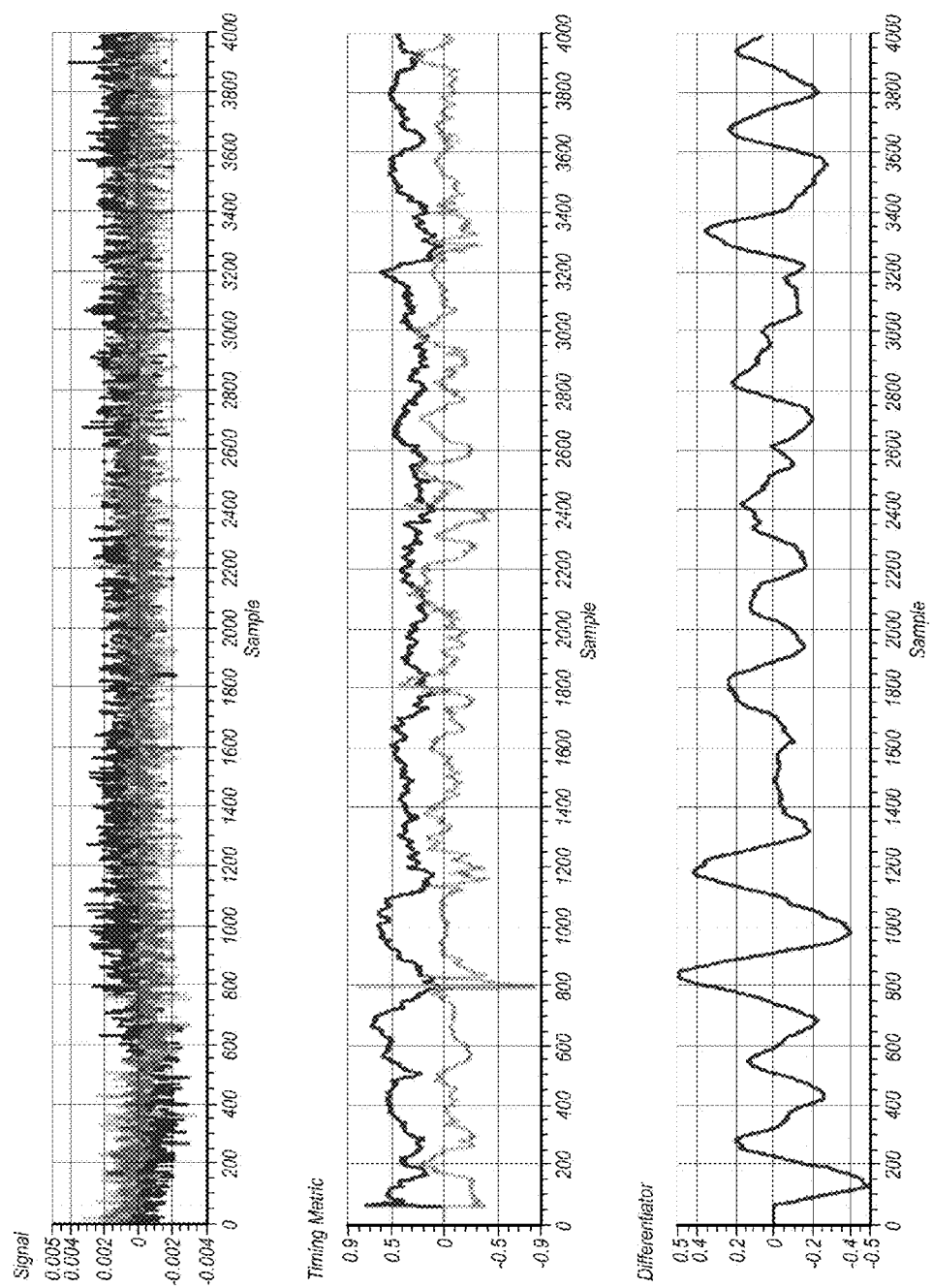

FIG. 6 is a signal diagram that shows differentiator behavior in the case of non-linear distortions due to RF impairments in the absence of any wanted signal. As shown, these distortions may cause various peaks in the differentiator signal, which may cause a false positive using traditional signal detection techniques.

For at least these reasons, improvements in Schmidl-Cox-based signal detection techniques may be desired. In some embodiments, a receiver is configured to use one or more signal recognition criteria in addition to and/or in place of the Schmidl-Cox threshold in the positive differentiator peak to determine whether a received message includes a desired signal.

Exemplary Signal Recognition Criteria

Figure 7:
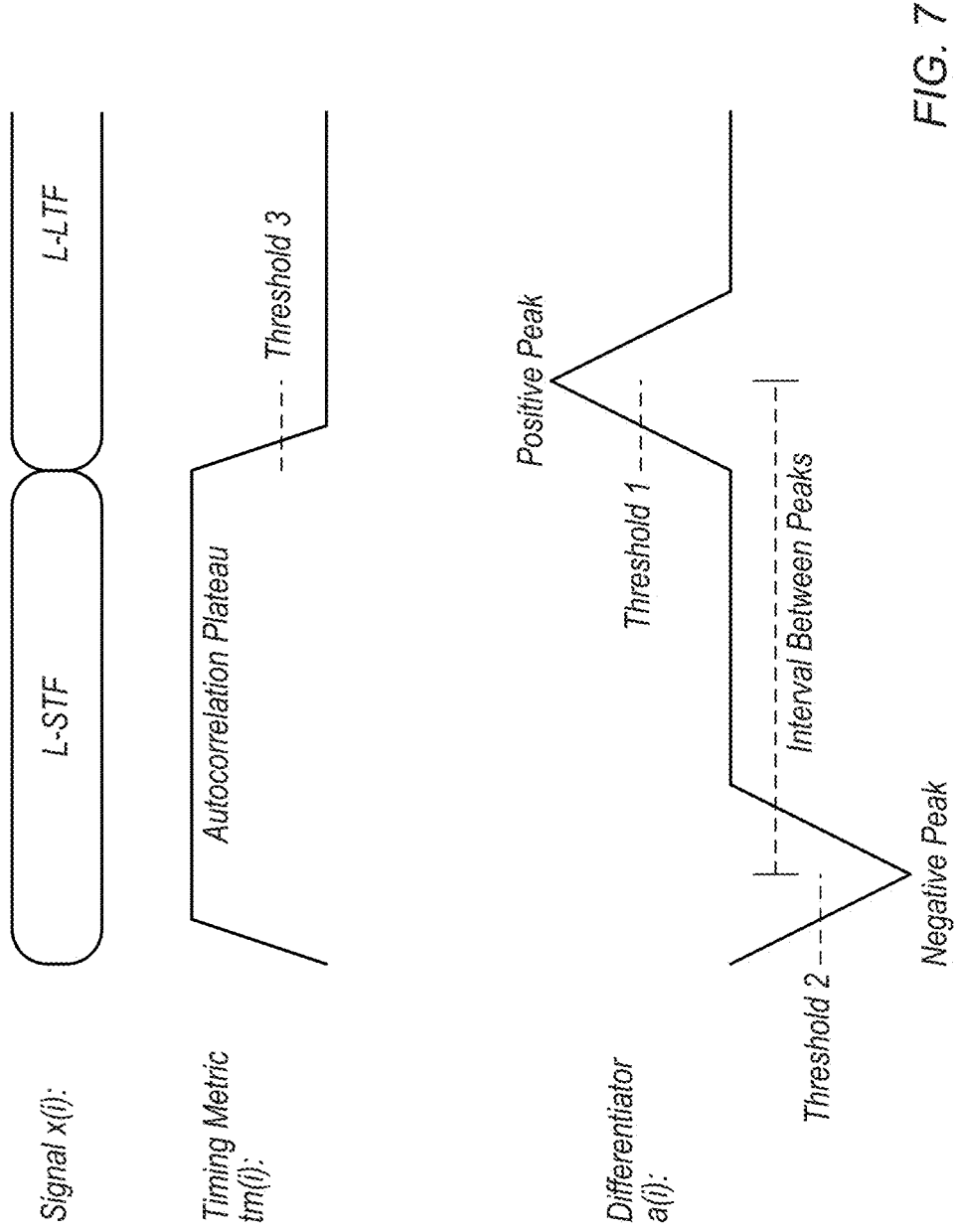
FIG. 7 is a simplified signal diagram illustrating exemplary signal recognition criteria, according to some embodiments.

FIG. 7 shows the signal, timing metric, and differentiator of FIG. 3 along with additional measurements/thresholds relating to signal recognition criteria. In the illustrated embodiment, in addition to the threshold for the positive peak (threshold 1), a threshold for the negative peak in the differentiator (threshold 2) and a threshold for the timing metric (threshold 3) may be utilized. Further, the length of the time interval between peaks in the differentiator may correspond to the length of the training field (e.g., L-STF) and may be utilized.

In some embodiments, a first signal recognition criterion is that both (1) the positive peak is above threshold 1 for a pre-determined number of cycles and (2) the negative peak is below threshold 2 for a pre-determined number of cycles.

In some embodiments, a second signal recognition criterion is that the time interval between the negative peak and the positive peak is within a range of values corresponding to the training field. For example, if the training field is eight is in length, the range of values may be seven to nine µs. In some embodiments, threshold 1 and threshold 2 are used to determine the location of the peaks to determine the length of the interval. For example, the negative peak may be determined by determining a midpoint between the differentiator passing below threshold 2 and passive above threshold 2.

In some embodiments, a third signal recognition criterion is that the positive peak corresponds to an autocorrelation peak value that is below threshold 3. This criterion is met in the illustrated example. In some embodiments, a fourth signal recognition criteria may be that the negative peak occurs at a point in time when the autocorrelation peak is above a predetermined threshold (not shown).

The disclosed signal recognition criteria may be used independently or in combination. For example, the receiver may require that all of the criteria are met in some embodiments or that only a subset of the criteria are met in some situations or embodiments.

In the illustrated embodiment, because of the exemplary operations used to determine the differentiator, the negative peak in the differentiator corresponds to the beginning of the training interval and autocorrelation peak and the positive peak in the differentiator corresponds to the end of the training interval and the autocorrelation peak. In other embodiments, the polarities of these peaks may be different, e.g., depending on the equation used to determine the differentiator. Thus, in some embodiments the first peak is negative and the second peak is positive (as shown) while in other embodiments the first peak is negative and the second peak is positive. In various embodiments, the two peaks in the differentiator have different polarities such that one of the peaks is positive and the other is negative. In various embodiments, any of various appropriate threshold values may be used for thresholds 1, 2, 3 and/or other threshold values. Further, depending on the polarity of data, a value or peak "satisfying" a particular threshold may refer to being either above or below the threshold, in various embodiments.

Exemplary Method

Figure 8:
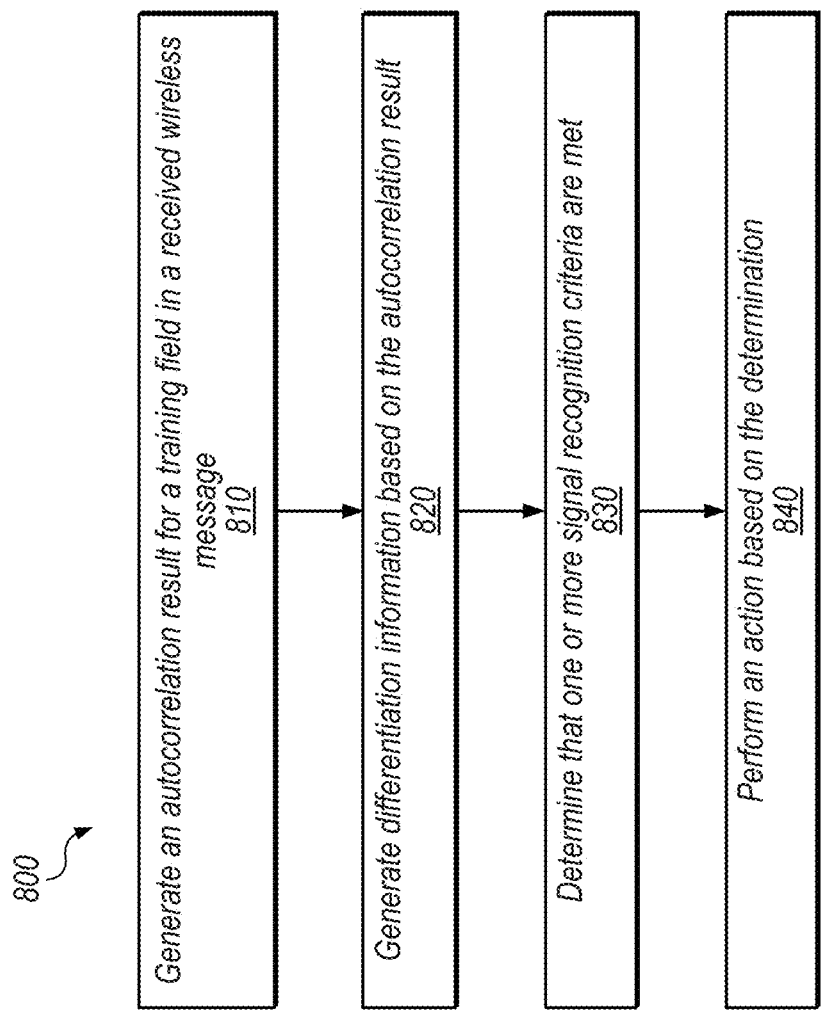
FIG. 8 is a flow diagram illustrating a method for detecting wireless signals, according to some embodiments.

FIG. 8 shows a flow diagram illustrating one exemplary embodiment of a method 800 for signal detection. The method shown in FIG. 8 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at 810.

At 810, an autocorrelation result is generated for a training field in a received wireless message. In some embodiments, the training field is an L-STF field. In some embodiments, the autocorrelation result is generated according to equation (3), while other techniques may be used in other embodiments.

At 820, differentiation information is generated based on the autocorrelation result. In some embodiments, the differentiation information is generated according to equation (4) while other techniques may be used to generate differentiation information for an autocorrelation result in other embodiments.

At 830, it is determined that one or more signal recognition criteria are met. In some embodiments, a first criterion is that a first peak in the differentiation information (e.g., the positive peak in FIG. 7) satisfies a first threshold for at least a first time interval. In some embodiments, there are also one or more additional criteria.

The additional criteria may include a criterion that a second peak in the differentiation information satisfies a second threshold for at least a second time interval. For example, in FIG. 7, the negative peak may correspond to the second peak (the terms "first," "second," etc. are not intended to connote any particular ordering) and may remain below threshold 2 for at least a pre-determined number of samples in addition to the positive peak remaining above threshold 1 for at least a pre-determined number of samples. The threshold number of samples may be associated with (e.g., some fraction of or multiple of) the length of the cyclic prefix in some embodiments. In some embodiments, the number of cycles or samples for various time interval thresholds may be configurable.

The additional criteria may include a criterion that the first peak corresponds to an autocorrelation result value that is below a particular autocorrelation threshold. For example, as shown in FIG. 7, the positive peak occurs at a time when the timing metric is below threshold 3. This may ensure that the detected positive peak is actually occurring after the training field, as expected, in some embodiments.

Yet another criterion may be a criterion that a time interval between the first peak and the second peak corresponds to a length of the training field. In some embodiments, a range of values corresponding to the length of the training field may be defined and a measured interval may be compared to the range of values. This may ensure that the two peaks correspond to the beginning and end of the autocorrelation plateau, in some embodiments.

In various embodiments, the disclosed criterion may be used separately or in combination.

At 840, an action is performed based on the determination. In some embodiments, detection circuitry may indicate to other circuitry that a signal have been detected. In some embodiments, the receiver may perform time and/or frequency synchronization in response to the criterion being met. In some embodiments, further decoding of the message may be performed in response to the criterion being met. In various embodiments, the disclosed techniques may reduce false positives, false negatives, and/or signal processing errors, which may improve communication quality and/or reduce power consumption.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device may be configured to include a processor (or a set of processors) and a memory medium, where the memory medium stores program instructions, where the processor is configured to read and execute the program instructions from the memory medium, where the program instructions are executable to implement a method, e.g., any of the various method embodiments described herein (or, any combination of the method embodiments described herein, or, any subset of any of the method embodiments described herein, or, any combination of such subsets). The device may be realized in any of various forms.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
generating an autocorrelation result for a training field in a received wireless message;
generating differentiation information based on the autocorrelation result;
determining that one or more signal recognition criteria are met, wherein the signal recognition criteria include:
a first criterion that a first peak in the differentiation information satisfies a first threshold for at least a first time interval; and
one or more additional criterion that include at least one of:
a second criterion that a second peak in the differentiation information satisfies a second threshold for at least a second time interval, wherein the first and second peaks have different polarities;
a third criterion that the first peak corresponds to an autocorrelation result value that is below a particular autocorrelation threshold; and
performing at least one of time synchronization or frequency synchronization for the wireless message in response to determining that the one or more signal recognition criteria are met.

2. The method of claim 1, wherein the signal recognition criteria further include:
a criterion that a time interval between the first peak and the second peak is within a predetermined range of values corresponding to a length of the training field.

3. The method of claim 1, wherein the one or more additional criterion include the second criterion and not the third criterion.

4. The method of claim 1, wherein the generating the autocorrelation result and generating the differentiation information are performed using Schmidl-Cox-based autocorrelation techniques.

5. The method of claim 1, wherein the wireless message is an 802.11 wireless message and the training field is a non-high throughput short training field (STF).

6. The method of claim 1, wherein the second time interval corresponds to a particular number of samples.

7. The method of claim 1, wherein the one or more additional criterion include the third criterion and not the second criterion.

8. The method of claim 1, wherein the one or more additional criterion include both the second criterion and the third criterion.

9. An apparatus, comprising wireless circuitry configured to:
generate an autocorrelation result for a training field in a received wireless message;
generate differentiation information based on the autocorrelation result;
determine that one or more signal recognition criteria are met, wherein the signal recognition criteria include:
a first criterion that a first peak in the differentiation information satisfies a first threshold for at least a first time interval; and
one or more additional criterion that include at least one of:
a second criterion that a second peak in the differentiation information satisfies a second threshold for at least a second time interval, wherein the first and second peaks have different polarities;
a third criterion that the first peak corresponds to an autocorrelation result value that is below a particular autocorrelation threshold; and
indicate detection of the wireless message in response to determining that the one or more signal recognition criteria are met.

10. The apparatus of claim 9, wherein the wireless circuitry is further configured to perform least one of time synchronization or frequency synchronization for the wireless message in response to determining that the one or more signal recognition criteria are met.

11. The apparatus of claim 9, wherein the signal recognition criteria further include:

a criterion that a time interval between the first peak and the second peak is within a predetermined range of values corresponding to a length of the training field.

12. The apparatus of claim 9, wherein the one or more additional criterion include the second criterion and not the third criterion.

13. The apparatus of claim 9, wherein the one or more additional criterion include the third criterion and not the second criterion.

14. The apparatus of claim 9, wherein the one or more additional criterion include both the second criterion and the third criterion.

15. A non-transitory computer-readable medium having instructions stored thereon that are executable by a computing device to perform operations comprising:
   generating an autocorrelation result for a training field in a received wireless message;
   generating differentiation information based on the autocorrelation result;
   determining that one or more signal recognition criteria are met, wherein the signal recognition criteria include:
      a first criterion that a first peak in the differentiation information satisfies a first threshold for at least a first time interval; and
      one or more additional criterion that include at least one of:
         a second criterion that a second peak in the differentiation information satisfies a second threshold for at least a second time interval, wherein the first and second peaks have different polarities;
         a third criterion that the first peak corresponds to an autocorrelation result value that is below a particular autocorrelation threshold; and
   causing at least one of time synchronization or frequency synchronization to be performed for the wireless message in response to determining that the one or more signal recognition criteria are met.

16. The non-transitory computer-readable medium of claim 15, wherein the signal recognition criteria further include:
   a criterion that a time interval between the first peak and the second peak corresponds to a length of the training field.

17. The non-transitory computer-readable medium of claim 15, wherein the one or more additional criterion include the second criterion and not the third criterion.

18. The non-transitory computer-readable medium of claim 15, wherein the one or more additional criterion include the third criterion and not the second criterion.

19. The non-transitory computer-readable medium of claim 15, wherein the one or more additional criterion include both the second criterion and the third criterion.

* * * * *